US012643222B2

(12) United States Patent
Matsui

(10) Patent No.: US 12,643,222 B2
(45) Date of Patent: Jun. 2, 2026

(54) PARALLEL LINK ROBOT AND PARALLEL LINK ROBOT SYSTEM

(71) Applicant: FANUC CORPORATION, Yamanashi (JP)

(72) Inventor: Hideo Matsui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/840,904

(22) PCT Filed: Mar. 18, 2022

(86) PCT No.: PCT/JP2022/012770
§ 371 (c)(1),
(2) Date: Aug. 23, 2024

(87) PCT Pub. No.: WO2023/175949
PCT Pub. Date: Sep. 21, 2023

(65) Prior Publication Data
US 2025/0196323 A1 Jun. 19, 2025

(51) Int. Cl.
B25J 9/10 (2006.01)
B25J 9/00 (2006.01)
B25J 17/02 (2006.01)

(52) U.S. Cl.
CPC .......... B25J 9/0051 (2013.01); B25J 9/0009 (2013.01); B25J 9/102 (2013.01); B25J 17/0266 (2013.01)

(58) Field of Classification Search
CPC ........ B25J 9/0051; B25J 9/0009; B25J 9/102; B25J 17/0266

USPC ........................................................ 74/490.01
See application file for complete search history.

(56) References Cited

U.S. PATENT DOCUMENTS

2008/0141813 A1* 6/2008 Ehrat ........................ B25J 9/103
74/490.01

FOREIGN PATENT DOCUMENTS

| | | | | | |
|---|---|---|---|---|---|
| DE | 102019201629 | A1 * | 8/2019 | ................ | B25J 9/10 |
| EP | 1084802 | A2 * | 3/2001 | .......... | B25J 17/0266 |
| EP | 2796393 | A1 * | 10/2014 | ........... | B25J 9/0051 |
| JP | S63-166389 | U | 10/1988 | | |
| JP | 2015-020234 | A | 2/2015 | | |
| JP | 2017-074630 | A | 4/2017 | | |
| KR | 10-2017-0124694 | A | 11/2017 | | |
| KR | 101798086 | B1 * | 11/2017 | ........... | B25J 9/0045 |

* cited by examiner

*Primary Examiner* — T. Scott Fix
(74) *Attorney, Agent, or Firm* — HAUPTMAN HAM, LLP

(57) ABSTRACT

A parallel link robot according to one aspect of the present disclosure includes a plurality of arm units and a movable part commonly connected to distal ends of the plurality of arm units. Each of the arm units includes a pedestal, a first arm rotatably supported on the pedestal, a second arm rotatably connected to the first arm, a motor installed in the pedestal, and a reduction gear installed in the pedestal and configured to transmit rotation of the motor to the first arm. The pedestal is provided with a mounting structure for individually mounting the arm unit to an external trestle. The pedestal is equipped with a cable connector for ensuring a direct connection with an external control device.

6 Claims, 8 Drawing Sheets

PARALLEL LINK ROBOT AND PARALLEL LINK ROBOT SYSTEM

RELATED APPLICATIONS

The present application is a National Phase of International Application No. PCT/JP2022/012770 filed Mar. 18, 2022.

TECHNICAL FIELD

The present invention relates to a parallel link robot and a parallel link robot system.

BACKGROUND ART

In recent years, with the evolution of robot technology, various types of robots have been proposed and used. For example, a parallel link robot is known as a robot suitable for moving and handling workpieces in three-dimensional space. Since the parallel link robot uses multiple arm mechanisms to drive and control the movement of the movable part relative to the base part, the movable part can be moved at high speed and with precision. Therefore, parallel link robots are used in food factories and other places where high-speed and precise operations are required.

Parallel link robots used in food factories need to be cleaned regularly to prevent the growth of bacteria. Therefore, various methods have been proposed for waterproofing technology for robots so that the robots can withstand cleaning (for example, Patent Literature 1).

However, parallel link robots often consist of a plurality of units, such as a base unit, a motor unit, a base cover, and the like and many parts have to be waterproofed in the first place.

CITATION LIST

Patent Literature

Patent Literature 1: Japanese Unexamined Utility Model Application Publication No. 63-166389

DETAILED DESCRIPTION

Figure 1:
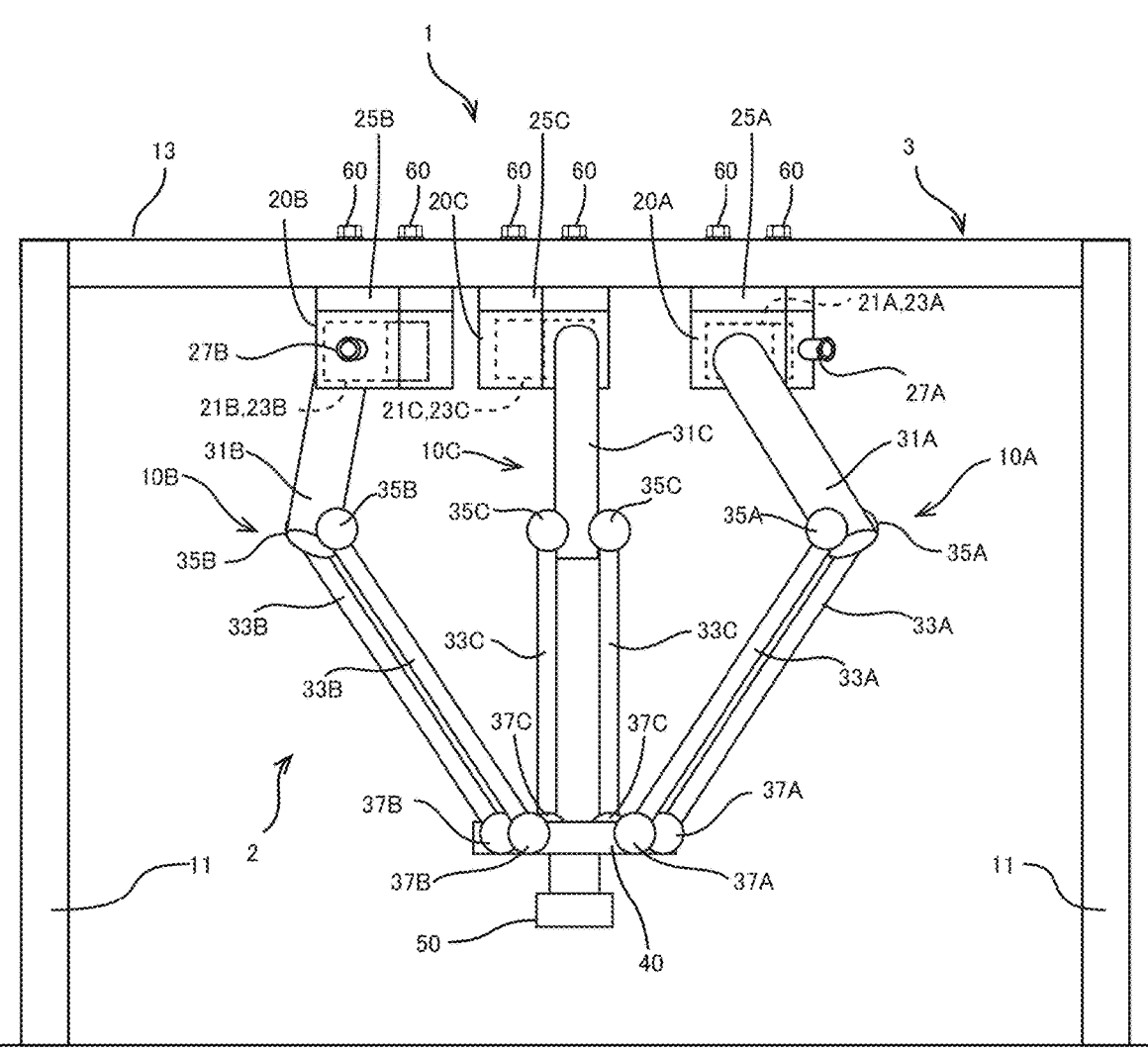
FIG. 1 is a front view showing an example of a parallel link robot system including a parallel link robot according to the present embodiment.

A parallel link robot according to one aspect of the present disclosure is provided with a plurality of arm units, and a movable part commonly connected to distal ends of the plurality of arm units. Each of the arm units includes a pedestal, a first arm rotatably supported on the pedestal, a second arm rotatably connected to the first arm, a motor installed in the pedestal, and a reduction gear installed in the pedestal and configured to transmit rotation of the motor to the first arm. The pedestal is provided with a mounting structure for individually mounting the arm unit to an external trestle. The pedestal is equipped with a cable connector for ensuring a direct connection with an external control device.

Hereinafter, a parallel link robot system including a parallel link robot according to the present embodiment will be described with reference to the drawings. In the following description, constituent elements having substantially the same function and configuration are denoted by the same reference numeral, and repetitive descriptions will be given only where necessary.

Figure 2:
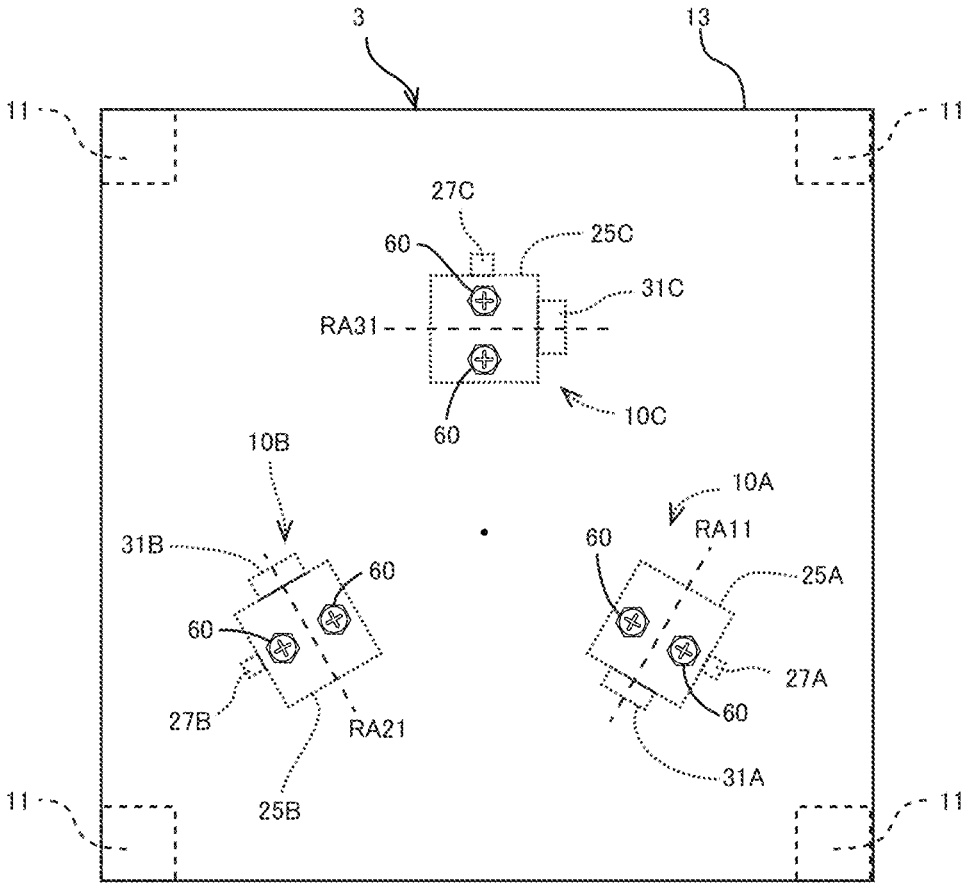
FIG. 2 is a plan view of FIG. 1 and shows a connecting portion between the parallel link robot and a trestle.

As shown in FIG. 1 and FIG. 2, a parallel link robot system 1 includes a parallel link robot 2 and a trestle 3 on which the parallel link robot 2 can be mounted. The parallel link robot 2 includes a plurality of, in this case three, arm units 10A, 10B, and 10C, a movable plate (movable part) 40 commonly connected to the distal ends of the three arm units 10A, 10B, and 10C, and an adapter 50 fixed to one side of the movable plate 40. An end effector (not shown) such as a robot hand or a suction pad is attached to the adapter 50.

The three arm units 10A, 10B, and 10C have the same configuration. Therefore, the arm unit 10A will be described here, and the description of the arm units 10B and 10C will be omitted.

The arm unit 10A has a pedestal 20A, which is a box body having a rectangular parallelepiped shape, a rod-shaped first arm 31A rotatably supported by the pedestal 20A, and two elongated rod-shaped second arms 33A rotatably supported by the first arm 31A. The pedestal 20A has, as a drive mechanism, a motor 21A that generates power for driving the first arm 31A and a reduction gear 23A that reduces the rotation of the motor 21A and transmits the rotation to the first arm 31A. The first arm 31A is connected to the output shaft of the drive mechanism (reduction gear 23A). The first arm 31A is connected to the two second arms 33A via two spherical bearings 35A, respectively. The two second arms 33A are connected to the movable plate 40 via two spherical bearings 37A, respectively. The arm unit 10A is configured such that a total of four spherical bearings 35A and 37A, that is, two spherical bearings 35A on one end side and two spherical bearings 37A on the other end side of the second arms 33A, are positioned at respective vertexes of a parallelogram.

The pedestal 20A is provided with a cable connector 27A for ensuring a direct connection of an external control device to the motor 21A accommodated in the pedestal 20A or to a control board for controlling the motor 21A. By connecting a cable extending from the control device to the cable connector 27A provided on the pedestal 20A, the control device can control the rotation of the motor 21A accommodated in the pedestal 20A. Typically, the cable connector 27A is provided on one side surface of the pedestal 20A. The first arm 31A is rotatably supported on another side surface of the pedestal 20A.

The pedestal 20A has a mounting structure for mounting the arm unit 10A on the trestle 3. Typically, as the mounting structure, a mounting block 25A having bolt insertion holes through which bolts 60 can be screwed is connected to the pedestal 20A. Typically, the mounting block 25A, which has a rectangular parallelepiped shape, is integrally formed on the top surface of the pedestal 20A, which has a rectangular parallelepiped shape, and bolt insertion holes are provided on the top surface of the mounting block 25A.

As shown in FIG. 1 and FIG. 2, the trestle 3 has a top plate 13 and a plurality of, in this case four, struts 11 that support the top plate 13. The top plate 13 corresponds to the mounting member on which the arm units 10A, 10B, and 10C are mounted, and the struts 11 correspond to the support members that support the mounting member. The top plate 13 has a plurality of holes communicating with the bolt insertion holes of the arm units 10A, 10B, and 10C. The arm units 10A, 10B, and 10C are mounted on the top plate 13 by bolts 60 with the bolt insertion holes of the mounting blocks 25A, 25B, and 25C aligned with the holes formed in the top plate 13. The three arm units 10A, 10B, and 10C are mounted on the top plate 13 in such a manner that a plane formed by rotation axes RA11, RA21, and RA31, which are the rotation axes of the three first arms 31A, 31B, and 31C, is horizontal.

One feature of the parallel link robot 2 according to the present embodiment is that each of the three motor units of the conventional parallel link robot can be individually mounted on the trestle 3. This feature is achieved by accommodating the three motor units of the conventional parallel link robot in the three pedestals 20A, 20B, and 20C, respectively, and providing each of the pedestals 20A, 20B, and 20C with a cable connector and a structure that can be mounted on the trestle 3. With this feature, the parallel link robot 2 according to the present embodiment has the following effects.

Since the parallel link robot 2 according to the present embodiment has a simple structure, the number of parts to be waterproofed can be reduced. Specifically, in the parallel link robot 2 according to the present embodiment, the parts that require waterproof measures, such as the motor 21A and the reduction gear 23A, are concentrated in the pedestal 20A, so that the pedestal 20A needs to be waterproofed. For example, waterproofing is applied between the casing and the cover of the pedestal 20A, and the connecting portion between the pedestal 20A and the first arm 31A. However, the parallel link robot 2 according to the present embodiment does not have a base unit to which a plurality of motor units are commonly connected as in the conventional parallel link robot. Accordingly, there are no parts where waterproofing is required due to the presence of the base unit, such as between the casing and the cover of the base unit and between the base unit and the motor unit. When mounting the arm unit 10A on the trestle 3, instead of mounting the pedestal 20A directly on the trestle 3 with bolts 60, the mounting block 25A is connected to the pedestal 20A and the mounting block 25A is mounted on the trestle 3 with bolts 60, so that the bolts 60 do not penetrate part of the casing of the pedestal 20A and thus waterproofing need not be applied between the trestle 3 and the arm unit 10A As described above, according to the parallel link robot 2 of the present embodiment, it is possible to reduce the number of parts to be waterproofed as compared with the conventional parallel link robot.

The parallel link robot 2 according to the present embodiment has a high degree of freedom in installation because the three arm units 10A, 10B, and 10C can be individually mounted on the trestle 3. Since the degree of freedom in installation is high, the parallel link robot system 1 including the parallel link robot 2 and the trestle 3 according to the present embodiment can be installed in places where the installation height is restricted. This effect will be described with reference to FIG. 1, FIG. 3, FIG. 4, and FIG. 5. FIG.

Figure 3:
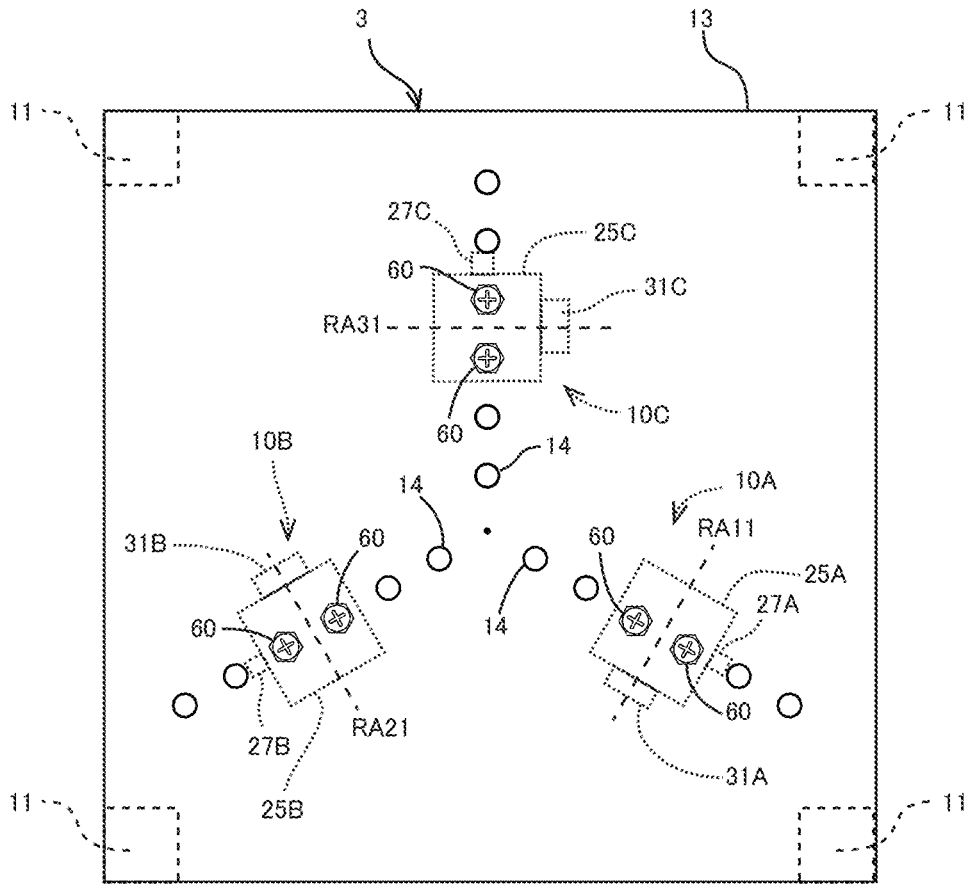
FIG. 3 is a plan view of FIG. 1 and shows another example of the trestle.
Figure 4:
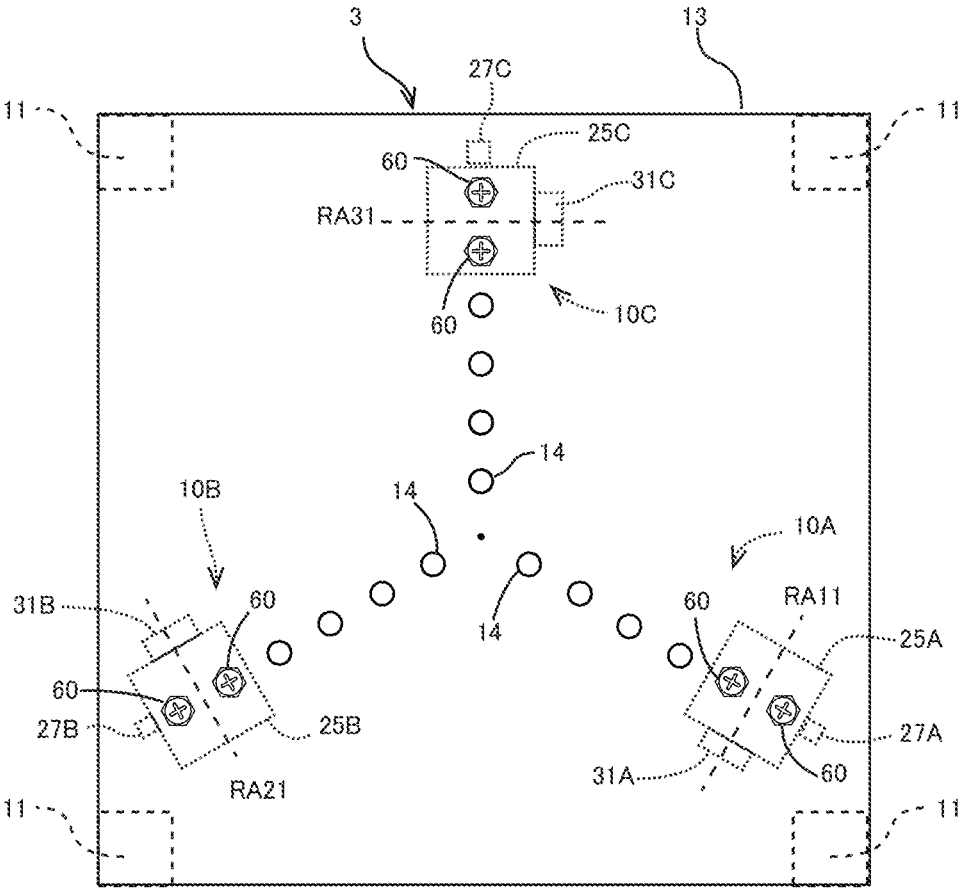
FIG. 4 is a plan view showing a state in which the mounting positions of the arm units on the trestle have been changed from the state in FIG. 3.
Figure 5:
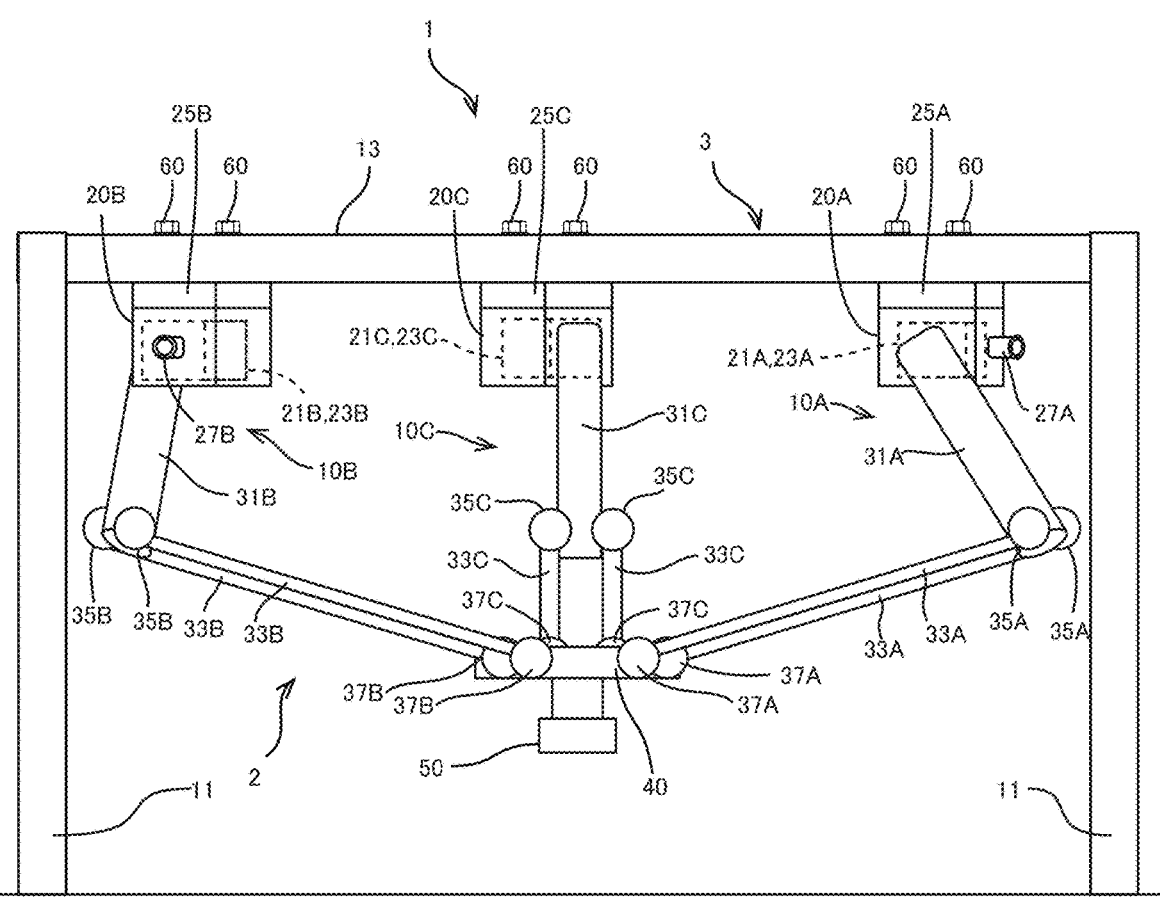
FIG. 5 is a front view of FIG. 4.

3 is a plan view showing a state in which the arm units 10A, 10B, and 10C are respectively mounted at positions near the center of the top plate 13. FIG. 1 is a front view of FIG. 3. FIG. 4 is a plan view showing a state in which the arm units 10A, 10B, and 10C are respectively mounted at positions far from the center of the top plate 13. FIG. 5 is a front view of FIG. 4. As shown in FIG. 3 and FIG. 4, a plurality of holes 14 are formed in the top plate 13 so that the arm units 10A, 10B, and 10C can be mounted at arbitrary positions of the top plate 13 (the trestle 3).

As shown in FIG. 4 and FIG. 5, the movable range of the movable plate 40 in the vertical direction can be physically narrowed by disposing the arm units 10A, 10B, and 10C on the trestle 3 at positions far from the center of the top plate 13, that is, so that the distance between the arm units 10A, 10B, and 10C is wide. This allows the height of the trestle 3 supporting the parallel link robot 2 to be reduced. As described above, according to the parallel link robot system 1 including the parallel link robot 2 according to the present embodiment, the parallel link robot system 1 having an arbitrary height can be constructed by merely changing the mounting positions of the three arm units 10A, 10B, and 10C constituting the parallel link robot 2 on the trestle 3, without changing the physical configuration of the arm units 10A, 10B, and 10C themselves. As described above, the parallel link robot system 1 including the parallel link robot 2 according to the present embodiment can be installed in places where the installation height is restricted.

Figure 6:
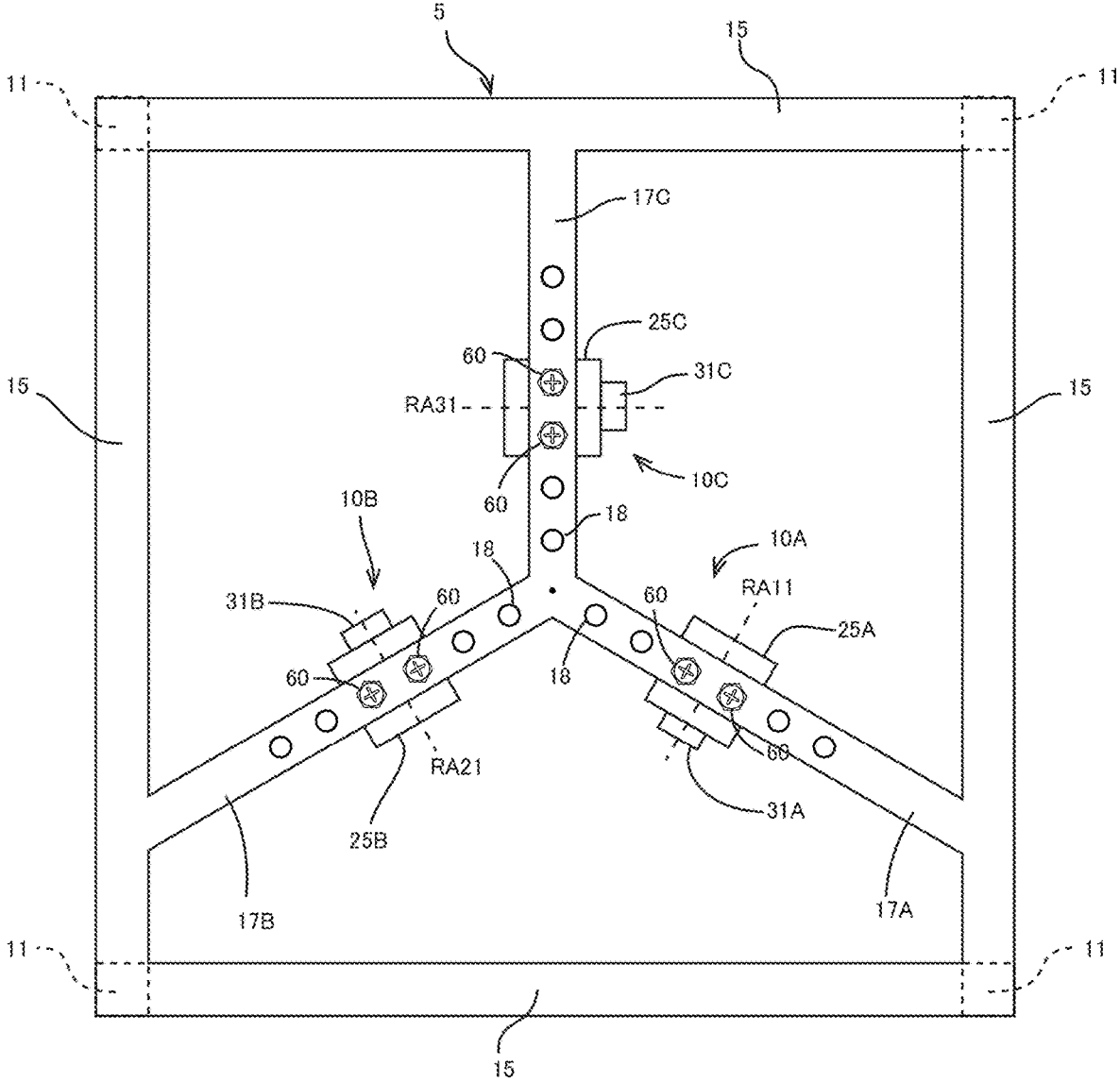
FIG. 6 is a plan view of FIG. 1 and shows another example of the trestle.

In FIG. 3 and FIG. 4, the trestle 3 is composed of the top plate 13 and the four struts 11 that support the top plate 13, but the configuration of the trestle 3 is not limited to this as long as the arm units 10A, 10B, and 10C can be mounted thereon. For example, the trestle can be configured so as not to inhibit the operations of the first arms 31A, 31B, and 31C. As shown in FIG. 6, for example, the trestle 5 has four struts 11 disposed at the four vertexes of a quadrangle, four connecting members 15 for connecting two adjacent struts 11 to each other at the distal ends of the four struts 11, and three rod-shaped mounting members 17A, 17B, and 17C for mounting the arm units 10A, 10B, and 10C, respectively. The mounting members 17A, 17B, and 17C are provided with a plurality of holes 18 that communicate with bolt insertion holes of the mounting blocks 25A, 25B, and 25C of the arm units 10A, 10B, and 10C. As shown in FIG. 6, the mounting members 17A, 17B, and 17C are disposed at positions where they do not overlap the first arms 31A, 31B, and 31C in plan view (positions where they do not cover the first arms 31A, 31B, and 31C) so as not to interfere with the first arms 31A, 31B, and 31C.

Figure 7:
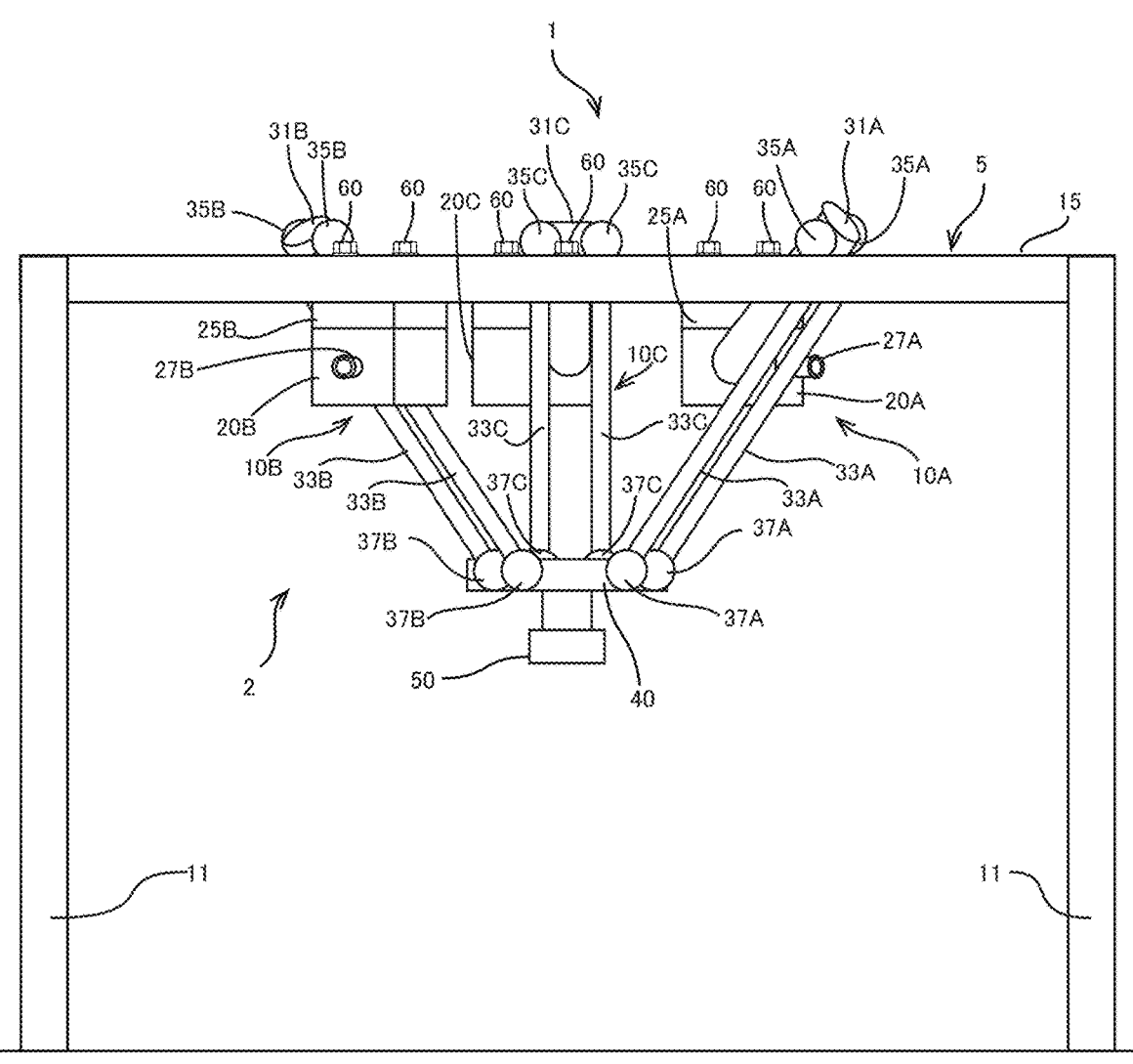
FIG. 7 is a supplementary diagram for explaining the effect of using the trestle shown in FIG. 6.

As shown in FIG. 1 to FIG. 5, in the case where the member on which the arm units 10A, 10B, and 10C are mounted is a plate-shaped top plate 13, the rotation angles of the first arms 31A, 31B, and 31C are limited to about ±90 degrees with the vertical direction as 0 degrees to prevent the first arms 31A, 31B, and 31C from colliding with the top plate 13. On the other hand, when the members on which the arm units 10A, 10B, and 10C are mounted are rod-shaped mounting members 17A, 17B, and 17C and the mounting members 17A, 17B, and 17C are provided so as not to hinder the rotation of the first arms 31A, 31B, and 31C as shown in FIG. 6, the rotation angles of the first arms 31A, 31B, and 31C are not limited by the mounting members. Accordingly, as shown in FIG. 7, the first arms 31A, 31B, and 31C can be rotated to above the frame of the trestle 5 defined by the struts 11, the connecting members 15, and the mounting members 17, and the movable range of the parallel link robot 2 can be widened.

Figure 8:
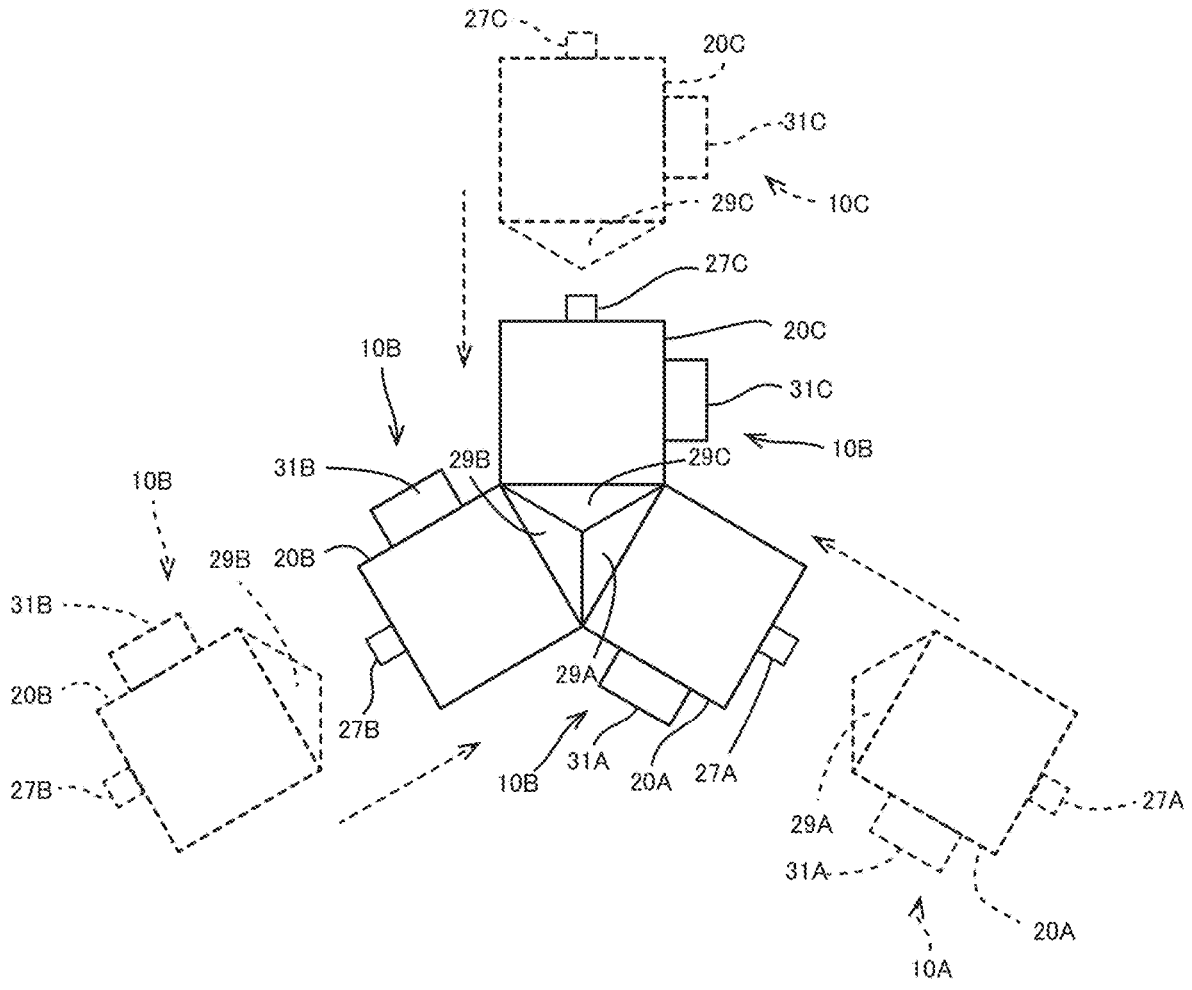
FIG. 8 is a plan view showing another example of the parallel link robot according to the present embodiment.

The arm units 10A, 10B, and 10C constituting the parallel link robot 2 according to the present embodiment have mounting structures for mounting on the trestle 3. However, the arm units 10A, 10B, and 10C may have connecting structures for connecting to each other. In addition, the arm units 10A, 10B, and 10C may have a structure capable of fixing the positional relationship therebetween. For example, the arm units 10A, 10B, and 10C are configured such that the pedestals 20A, 20B, and 20C have abutting surfaces that abut against each other as the structure capable of fixing the positional relationship of the arm units 10A, 10B, and 10C. As shown in FIG. 8, the pedestal 20A has a triangular prism-shaped abutting block 29A so that it can abut against the other pedestals 20B and 20C. Similarly, the pedestals 20B and 20C have triangular prism-shaped abutting blocks 29B and 29C, respectively. The abutting blocks 29A, 29B, and 29C are each integrally formed on one side surface of the corresponding pedestal 20A, 20B, 20C. Since the arm units 10A, 10B, and 10C can be mounted on the trestle 3 with the abutting blocks 29A, 29B, and 29C provided on the pedestals 20A, 20B, and 20C abutting against each other and their positional relationship fixed, the positioning accuracy of the arm units 10A, 10B, and 10C can be improved.

Although several embodiments of the present invention have been described, these embodiments are presented by way of example and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A parallel link robot, comprising:
a plurality of arm units; and
a movable part commonly connected to distal ends of the plurality of arm units, wherein
the plurality of arm units is configured to be separated from each other and individually mounted on an external trestle,
the plurality of arm units is respectively equipped with a plurality of cable connectors for connection with an external control device,
each of the plurality of arm units includes:
a pedestal;
a first arm rotatably supported on the pedestal;
a second arm rotatably connected to the first arm;
a motor installed in the pedestal; and
a reduction gear installed in the pedestal and configured to transmit rotation of the motor to the first arm, wherein
the pedestal is provided with a mounting structure for individually mounting the arm unit on the external trestle,
the pedestal is equipped with a cable connector among the plurality of cable connectors for a direct connection with the external control device,
a mounting block including insertion holes through which fastening members are insertable is connected to the pedestal as the mounting structure,
the pedestal has a plurality of holes communicating with the insertion holes of the mounting block,
the external trestle includes a mounting member on which the arm unit is mounted and a support member for supporting the mounting member, and the mounting member is provided with a plurality of further holes communicating with the insertion holes of the mounting block.

2. The parallel link robot according to claim 1, wherein each of the plurality of arm units includes a connecting structure for connecting to another arm unit of the plurality of arm units.

3. The parallel link robot according to claim 1, wherein the pedestal of each of the plurality of arm units includes an abutting surface that abuts against the pedestal of another arm unit of the plurality of arm units.

4. A parallel link robot system, comprising:
a trestle; and
a parallel link robot detachably attached to the trestle, wherein
the parallel link robot includes:
a plurality of arm units; and
a movable part commonly connected to distal ends of the plurality of arm units,
the plurality of arm units is configured to be separated from each other and individually mounted on the trestle,
the plurality of arm units is respectively equipped with a plurality of cable connectors for connection with an external control device,
each of the plurality of arm units includes:
a pedestal;
a first arm rotatably supported on the pedestal;
a second arm rotatably connected to the first arm;
a motor installed in the pedestal; and
a reduction gear installed in the pedestal and configured to transmit rotation of the motor to the first arm, wherein
the pedestal is provided with a mounting structure for individually mounting the arm unit to the trestle,
the pedestal is equipped with a cable connector among the plurality of cable connectors for a direct connection with the external control device,
a mounting block including insertion holes through which fastening members are insertable is connected to the pedestal as the mounting structure,
the pedestal has a plurality of holes communicating with the insertion holes of the mounting block,
the trestle includes a mounting member on which the arm unit is mounted and a support member for supporting the mounting member, and
the mounting member is provided with a plurality of further holes communicating with the insertion holes of the mounting block.

5. The parallel link robot system according to claim 4, wherein the mounting member is configured to not interfere with the first arm.

6. A parallel link robot, comprising:
a plurality of arm units; and
a movable part commonly connected to distal ends of the plurality of arm units, wherein each of the plurality of arm units includes:
a pedestal;
a first arm rotatably supported on the pedestal;
a second arm rotatably connected to the first arm;
a motor installed in the pedestal; and
a reduction gear installed in the pedestal and configured to transmit rotation of the motor to the first arm, wherein
the pedestal is provided with a mounting structure for individually mounting the arm unit on an external trestle, the pedestal is equipped with a cable connector for ensuring a direct connection with an external control device, a mounting block including insertion holes through which fastening members are insertable is connected to the pedestal as the mounting structure, the pedestal has a plurality of holes communicating with the insertion holes of the mounting block, the external trestle includes a mounting member on which the arm unit is mounted and a support member for supporting the mounting member, and the mounting member is provided with a plurality of further holes communicating with the insertion holes of the mounting block, and each of the pedestals includes an abutting surface that abuts against another pedestal.

* * * * *